(12) United States Patent
Riza et al.

(10) Patent No.: US 7,327,472 B2
(45) Date of Patent: Feb. 5, 2008

(54) HIGH TEMPERATURE, MINIMALLY INVASIVE OPTICAL SENSING MODULES

(75) Inventors: Nabeel Agha Riza, Oviedo, FL (US); Frank Perez, Tujunga, CA (US)

(73) Assignees: Nusensors, Inc., Oviedo, FL (US); University of Central Florida, Orlando, FL (US)

( * ) Notice: Subject to any disclaimer, the term of this patent is extended or adjusted under 35 U.S.C. 154(b) by 372 days.

(21) Appl. No.: 11/185,540

(22) Filed: Jul. 20, 2005

(65) Prior Publication Data

US 2006/0017932 A1    Jan. 26, 2006

Related U.S. Application Data

(60) Provisional application No. 60/590,672, filed on Jul. 23, 2004, provisional application No. 60/633,900, filed on Dec. 7, 2004.

(51) Int. Cl.
*G01B 9/02* (2006.01)
(52) U.S. Cl. ...................................... 356/519
(58) Field of Classification Search ................ None
See application file for complete search history.

(56) References Cited

U.S. PATENT DOCUMENTS

| | | | | |
|---|---|---|---|---|
| 4,334,781 A | * | 6/1982 | Ozeki | 356/368 |
| 5,285,783 A | * | 2/1994 | Secker | 600/323 |
| 6,153,881 A | * | 11/2000 | Castleman | 250/339.15 |

OTHER PUBLICATIONS

Nabeel A. Riza, Muzammil A. Arain, and Frank Perez, Harsh Environments Minimally Invasive Optical Sensor Using Free-Space Targeted Single-Crystal Silicon Carbide, IEEE Sensors Journal, vol. 6, No. 3, Jun. 2006, pp. 672-685.

Fei Yue, Xi Yangang, Chen Yuanjie, Ma Xiufang, Shen Yuanhua, Automation Of Temperature Measurement By Laser, SPIE vol. 3558 1998, pp. 87-92.

Michael K. Lang, Gregory W. Donohoe, Saleem H. Zaidi, Steven R.J. Brueck, Real-Time Image Processing Techniques For Noncontact Temperature Measurement, Optical Engineering, Oct. 1994, vol. 33 No. 10, pp. 3465-3471.

J.A. McCaulley, V.M. Donnelly, M. Vernon and I. Taha, Temperature dependence of the near-infrared refractive index of silicon, gallium arsenide, and indium phosphide, The American Physical Society, vol. 49, No. 11, Mar. 15, 1994, pp. 7408-7417.

(Continued)

*Primary Examiner*—Tu T Nguyen
(74) *Attorney, Agent, or Firm*—James H. Beusse; Beusse Wolter Sanks Mora & Maire, P.A.

(57) ABSTRACT

A remote temperature sensing system includes a light source selectively producing light at two different wavelengths and a sensor device having an optical path length that varies as a function of temperature. The sensor receives light emitted by the light source and redirects the light along the optical path length. The system also includes a detector receiving redirected light from the sensor device and generating respective signals indicative of respective intensities of received redirected light corresponding to respective wavelengths of light emitted by the light source. The system also includes a processor processing the signals generated by the detector to calculate a temperature of the device.

37 Claims, 8 Drawing Sheets

OTHER PUBLICATIONS

V.M. Donnelly, Real-time determination of the direciton of wafer temperature change by spatially resolved infrared laser interferometric thermometry, American Vacuum Society, Sep./Oct. 1993, pp. 2393-2397.

K.L. Saenger, F.Tong, J.S. Logan and W.M. Holber, Wavelength-modulated interferometric thermometry for improved substrate temperature measurement, American Institute of Physics, Aug. 1992, pp. 3862-3868.

Katherine L. Saenger, Julie Gupta, Laser interferometric thermometry for substrate temperature measurement, Applied Optics, vol. 30, No. 10, Apr. 1, 1991, pp. 1221-1226.

V.M. Donnelly, J.A. McCaulley, Infrared-laser interferometric thermometry:A nonintrusive technique for measuring semiconductor wafer temperatures; American Vacuum Society, Jan./Feb. 1990, vol. 8, No. 1 pp. 84-92.

K.L. Saenger, Interferometric measurement of substrate heating induced by pulsed laser irradiation. 1988 American Institute of Physics, Apr. 15, 1988, vol. 63, No. 8, pp. 2522-2525.

R.A. Bond, S. Dzioba, H.M. Naguib, Temperature measurements of glass substrates during plasma etching, 1981 American Vacuum Society, vol. 18, No. 2, Mar. 1981, pp. 335-338.

Balzers Aktiengeseilshcaft fur Jochvakumtechnik und Dunne Schicten, Optische Messung der Substrat-Temperatur in der Vakuumaufdampftechnik, Optik 1968, pp. 115-125.

F.C. Nix, D. MacNair, An Interferometric-Dilatometer With Photographic Recording, Rev. Sci. Inst., Feb. 1941, pp. 66-70.

Nabeel A. Riza, Muzzami Arain, Frank Perez, 6-H single-crystal silicon carbide thermo-optic coefficient measurements for ultrahigh temperatures up to 1273 K in the telecommunications infrared band, Journal of Applied Physics 98, 2005; pp. 103512-1-5.

Nabeel A. Riza, Muzzamil Arain, Frank Perez, Harsh environments minimally invasive optical sensing technique for extreme temperatues: 1000 C and approaching 2500 C; SPIE, vol. 5855, pp. 687-690, 2005.

Nabeel A. Riza, Muzammil A. Arain, Frank Perez, Harsh environments minimally invasive optical sensor using free-space targeted single-crystal silicon carbide, 2006 IEEE, pp. 672-685.

G. Beheim, Fibre-optic Thermometer Using Semiconductor-Etalon Sensor, Electronics Letters Feb. 27, 1986, vol. 22, No. 5, pp. 238-240.

Glenn Beheim, Remote displacement measurement using a passive interferometer with a fiber optic link, Applied Optics, Aug. 1, 1985, vol. 24, No. 15, pp. 2335-2340.

Lin Cheng, Andrew J. Steckl, James Scofield, SIC Thin-Film Fabry-Perot Interferometer for Fiber-Optic Temperature Sensor, 2003 IEEE, vol. 50, No. 10, pp. 2159-2164.

Lin Cheng, Andrew J. Steckl, James D. Scofield, Effect of Trimethylsilane Flow Rate On The Growth of SiC Thin-Films for Fiber-Optic Temperature Sensors, 2003 IEEE, vol. 12, No. 6, pp. 797-803.

Yibing Zhang, Gary R. Pickrell, Bring Qi, Ahmad Safaai-Jazi, Anbo Wang, Single-crystal sapphire-based optical high-temperature sensor for harsh environments, 2004 Society of Photo-Optical Instrumentation Engineers, vol. 43, No. 1, pp. 157-164.

Yizheng Zhu, Zhengyu Huang, Ming Han, Fabin Shen, Gary Pickrell, Anbo Wang, Fiber-optic high-temperature thermometer using sapphire fiber, SPIE, vol. 5590, 2004, pp. 19-26.

Zhengyu Huang, Gary Pickrell, Juncheng Xu, Yongxin Wang, Yibing Zhang, Anbo Wang, Sapphire Temperature Sensor Coal Gasifier Field Test, SPIE, vol. 5590, 2004, pp. 27-36.

Hai Xiao, Wei Zhao, Robert Lockhart, Jun Wang, Anbo Wang, Absolute Sapphire Optical fiber Sensor For High-Temperature Applications, SPIE, vol. 3201, pp. 36-42, no date.

Weizhuo Li, Don C. Abeysinghe, Joseph T. Body, Multiplexed sensor system for simultaneous measurement of pressure and temperature, 2004 Society of Photo-Optical Instrumentation Engineers, vol. 43, No. 1, pp. 148-156.

Woo-Hu Tsai, Chun-Jung Lin, A Novel Structure for the Intrinsic Fabry-Perot Fiber-Optic Temperature Sensor, 2001 IEEE, vol. 19, No. 5, pp. 682-686.

Zhengyu Huang, Wei Peng, Juncheng Xu, Gary R. Pickrell, Anbo Wang, Fiber temperature sensor for high-pressure environment, Optical Engineering, 2005 SPIE, vol. 44, No. 10, pp. 104401-1-104401-6.

Kent A. Murphy, Michael F. Gunther, Ashish M. Vengsarkar, Richard O. Claus, Quadrature phase-shifted, extrinsic Fabry-Perot optical fiber sensors, Feb. 15, 1991 Optics Letters, Vo. 16, No. 4, pp. 273-275.

Dan Grobnic, Stephen J. Mihailov, Christopher W. Smelser, Hulmin Ding, Ultra High Temperature FBG Sensor Made In Sapphire Fiber Using Femtosecond Laser Radiation, ECOC 2004 Proceedings, vol. 2, pp. 128-129.

Dan Grobnic, Christopher W. Smelser, Stephen J. Mihailov, Robert B. Walker, Isothermal Behavior of Fiber Braff Gratings Made with Ultrafast Radiation at Temperatures Above 1000 C, ECOC 2004 Proceedings, vol. 2, pp. 130-131.

* cited by examiner

US 7,327,472 B2

HIGH TEMPERATURE, MINIMALLY INVASIVE OPTICAL SENSING MODULES

SPECIFIC DATA RELATED TO INVENTION

This application claims the benefit of U.S. provisional application Ser. No. 60/590,672 filed on Jul. 23, 2004 and U.S. provisional application Ser. No. 60/633,900 filed on Dec. 7, 2004.

This invention was made with U.S. Government support awarded by the following agencies: U.S. Department of Energy (DOE) Grant No.: DE-FC26-03 NT41923. The U.S. has Certain rights in this invention.

BACKGROUND OF THE INVENTION

The present invention relates to optical sensors and, more particularly, to optical sensors using optical interferometry to implement remote sensing.

There are numerous vital sensing scenarios in commercial and defense sectors where the environment is extremely hazardous. Specifically, the hazards can be for instance due to extreme temperatures, extreme pressures, highly corrosive chemical content (liquids, gases, particulates), nuclear radiation, biological agents, and high Gravitational (G) forces. Realizing a sensor for such hazardous environments remains to be a tremendous engineering challenge. One specific application is fossil fuel fired power plants where temperatures in combustors and turbines typically have temperatures and pressures exceeding 1000° C. and 50 Atmospheres (atm). Future clean design zero emission power systems are expected to operate at even high temperatures and pressures, e.g., >2000° C. and >400 atm [J. H. Ausubel, "Big Green Energy Machines," The Industrial Physicist, AIP, pp. 20-24, October/November, 2004. ] In addition, coal and gas fired power systems produce chemically hazardous environments with chemical constituents and mixtures containing for example carbon monoxide, carbon dioxide, nitrogen, oxygen, sulphur, sodium, and sulphuric acid. Over the years, engineers have worked very hard in developing electrical high temperature sensors (e.g., thermo-couples using platinum and rodium), but these have shown limited life-times due to the wear and tear and corrosion suffered in power plants [R. E. Bentley, "Thermocouple materials and their properties," Chap. 2 in *Theory and Practice of Thermoelectric Thermometry: Handbook of Temperature Measurement*, Vol. 3, pp. 25-81, Springer-Verlag Singapore, 1998]. Electrical/electronic sensors have sufferred from a number of draw-backs and complications that include (i) melting of the solder joint between the sensor device and the bonding wire, (ii) requirement of high temperature insulation for the electrical wires connecting the device to the electrical signal processing unit, and (iii) inconvenience in mounting or embedding the device in rotating components such as turbine blades. Other limitations that are inherent to the use of thermocouples are cold junction compensation, linearization issues, long term stability of the thermal contacts, and corrosion of the expensive metallic contacts [H. Ernst, L. Rauscher, G. Bähr, E. Müller, and W. A. Kaysser, "Long-term stability and thermal cycling of thermocouple contacts to Si up to 350° C.," The Third European Conference on High Temperature Electronics (HITEN), pp. 87-90, 4-7 Jul. 1999].

Researchers have turned to optics for providing a robust high temperature sensing solution in these hazardous environments. The focus of these researchers have been mainly directed in two themes. The first theme involves using the optical fiber as the light delivery and reception mechanism and the temperature sensing mechanism. Specifically, a Fiber Bragg Grating (FBG) present within the core of the single mode fiber (SMF) acts as a temperature sensor. Here, a broadband light source is fed to the sensor and the spectral shift of the FBG reflected light is used to determine the temperature value. Today, commercial FBG sensors are written using Ultra-Violet (UV) exposure in silica fibers. Such FBG sensors are typically limited to under 600° C. because of the instability of the FBG structure at higher temperatures [B. Lee,"Review of the present status of optical fiber sensors," Optical Fiber Technology, Vol.9, pp. 57-79, 2003]. Recent studies using FBGs in silica fibers has shown promise up-to 1000° C. [M. Winz, K. Stump, T. K. Plant, "High temperature stable fiber Bragg gratings, "Optical Fiber Sensors (OFS) Conf. Digest, pp. 195 198, 2002; D. Grobnic, C. W. Smelser, S. J. Mihailov, R. B. Walker," Isothermal behavior of fiber Bragg gratings made with ultrafast radiation at temperatures above 1000 C," European Conf. Optical Communications (ECOC), Proc. Vol.2, pp. 130-131, Stockholm, Sep. 7, 2004]. To practically reach the higher temperatures (e.g., 1600° C.) for fossil fuel applications, single crystal Sapphire fiber has been used for Fabry-Perot cavity and FBG formation [H. Xiao, W. Zhao, R. Lockhart, J. Wang, A. Wang, "Absolute Sapphire optical fiber sensor for high temperature applications," SPIE Proc. Vol. 3201, pp. 36-42, 1998; D. Grobnic, S. J. Mihailov, C. W. Smelser, H. Ding, "Ultra high temperature FBG sensor made in Sapphire fiber using Isothermal using femtosecond laser radiation," European Conf. Optical Communications (ECOC), Proc. Vol.2, pp. 128-129, Stockholm, Sep. 7, 2004; Y. Zhang, G. R. Pickrell, B. Qi, A. S.-Jazi, A. Wang, "Single-crystal sapphire-based optical high temperature sensor for harsh environments," *Opt. Eng.*, 43, 157-164, 2004]. The single crystal Sapphire fiber FBG has a very large diameter (e.g., 150 microns) that introduces multi-mode light propagation noise that limits sensor performance. An alternate approach proposed replaced the Sapphire fiber frontend sensing element with a complex assembly of individual components that include a Sapphire bulk crystal that forms a temperature dependent birefringent Fabry-Perot cavity, a single crystal cubic zirconia light reflecting prism, a Glan-Thompson polarizer, a single crystal Sapphire assembly tube, a fiber collimation lens, a ceramic extension tube, and seven 200 micron diameter multimode optical fibers. Hence this sensor frontend sensing element not only has low optical efficiency and high noise generation issues due to its multi-mode versus SMF design, the sensor frontend is limited by the lowest high temperature performance of a given component in the assembly and not just by the Sapphire crystal and zircornia high temperature ability. Add to these issues, the polarization and component alignment sensitivity of the entire frontend sensor assembly and the Fabry-Perot cavity spectral notch/peak shape spoiling due to varying cavity material parameters.

It has long been recognized that SiC is an excellent high temperature material for fabricating electronics, optics, and optoelectronics. For example, engineers have used SiC substrates to construct gas sensors [A. Arbab, A. Spetz and I. Lundstrom, "Gas sensors for high temperature operation based on metal oxide silicon carbide (MOSiC) devices," Sensors and Actuators B, Vol. 15-16, pp. 19-23, 1993]. Prior works include using thin films of SiC grown on substrates such as Sapphire and Silicon to act as Fabry Perot Etalons to form high temperature fiber-optic sensors [G. Beheim, "Fibre-optic thermometer using semiconductor-etalon sensor," Electronics Letters, vol. 22, p. 238, 239, Feb. 27, 1986;

L. Cheng, A. J. Steckl, J. Scofield, "SiC thin film Fabry-Perot interferometer for fiber-optic temperature sensor," *IEEE Tran. Electron Devices*, Vol. 50, No.10, pp. 2159-2164, October. 2003; L. Cheng, A. J. Steckl, J. Scofield, "Effect of trimethylsilane flow rate on the growth of SiC thin-films for fiber-optic temperature sensors," Journal of Microelectromechanical Systems, , Volume: 12, Issue: 6, Pages: 797-803, December. 2003]. Although SiC thin films on high temperature substrates such as Sapphire can operate at high temperatures, the SiC and Sapphire interface have different material properties such as thermal coefficient of expansion and refractive indexes. In particular, high temperature gradients and fast temperature/pressure temporal effects can cause stress fields at the SiC thin film-Sapphire interface causing deterioration of optical properties (e.g., interface reflectivity) required to form a quality Fabry-Perot etalon needed for sensing based on SiC film refractive index change. In addition, SiC thin-films under high pressures can deform and also effect optical flatness of the etalon surface. In addition, previous techniques required the use of very broadband light (e.g., white light band and more) to realize spectrum modulation data with sufficient spectral resonance shifts to enable high resolution and sensitivity temperature measurement. Hence all the optics required must also work over these broad wavelengths. In effect, these mentioned SiC thin film sensors require sources and optics that are expensive, hard to design, and limited in performance. Note that these previous works also had a limitation on the measured unambiguous sensing (e.g., temperature) range dictated only by the SiC thin film etalon design, i.e., film thickness and reflective interface refractive indices/reflectivities. Thus maker a thinner SiC film would provide smaller optical path length changes due to temperature and hence increase the unambiguous temperature range. But making a thinner SiC film makes the sensor less sensitive and more fragile to pressure. Hence, a dilemma exists. In addition, temperature change is preferably estimated based on tracking optical spectrum minima shifts using precision optical spectrum analysis optics, making precise temperature estimation a challenge dependent on the precision (wavelength resolution) of the optical spectrum analysis hardware. In addition, better temperature detection sensitivity is achieved using thicker films, but thicker etalon gives narrower spacing between adjacent spectral minima. Thicker films are harder to grow with uniform thicknesses and then one requires higher resolution for the optical spectrum analysis optics. Hence there exists a dilemma where a thick film is desired for better sensing resolution but it requires a better precision optical spectrum analyzer (OSA) and of course thicker thin film SiC etalons are harder to make optically flat. Finally, all to these issues the Fabry-Perot cavity spectral notch/peak shape spoiling due to varying cavity material parameters that in-turn leads to deterioration in sensing resolution.

SUMMARY DESCRIPTION OF THE INVENTION

The present invention provides a robust optical sensor that can be remoted, is minimally invasive, works at high temperatures (e.g., 2000 C) and pressures, requires low cost low loss optics, has high sensing resolution over any extended unambiguous range, and provides easy access to many sensing points.

The invention includes remote interrogation of the frontend sensor chip by using a laser beam will eliminate the complications associated with electrical and prior art fiber-optic sensors, particularly in high temperature applications. In the sensor system, this dilemma is removed as a free-space laser beam reads sensing parameters off the frontend sensor chip made from a single crystal SiC optical chip, thus producing no physical contact between the harsh environment and the light delivery and processing optics. In effect, one can imagine many low cost single crystal SiC optical chips distributed in the desired sensing zone where a scanning free-space laser beam rapidly engages these sensor frontend chips to produce signals for later data processing and environmental parameter recovery. In effect, a truly non-invasive distributed optical sensor is realized.

A key novelty is the use of thick (e.g., 300 micron) single crystal SiC as the high temperature operation naturally forming etalon with air-SiC and SiC-air interfaces formed by the natural optical quality crystal structure. In this way, the frontend optical sensor chip forms intrinsically without using any other substrate material that can cause stresses and strains at the two material interface junctions. Given the refractive index of near 2.6 of single crystal 6H—SiC at room temperature, a Fresnel reflection power coefficient of near 0.2 or 20% interface reflectivity is formed. Hence, this naturally occurring Etalon has cavity mirror power reflectivities of 20%, leading to a strong Etalon behavior, given a designed SiC chip thickness. Because of the single crystal thick nature of the SiC sensor chip, the chip is indeed robust not only to high temperature but also high pressure and temporal gradients that can cause a thin-film chip to deform and be optically fragile. Note that for proper etalon operation, the two interfaces of the cavity must maintain mutual parallel states and optical flatness. Any deformity will cause not only the Fabry-Perot etalon calibration and behavior to change but also cause misalignment with the receive fiber-optics as used in prior art fiber-optic sensors based on SiC thin films. In effect, such a sensor will malfunction and provide erroneous data. To counter receive beam spoiling due to any environmental factors such as vibration of the free-space engaged chip itself or air thermal gradients in the path to/from the chip, provided in the present application innovation is the use of active beamforming mirror optics such as multi-electrode deformable mirror and 2-axis pointing mirror to guarantee proper alignment of the receive beam on the freespace photodetector.

Another novel aspect of the invention is the use of a tunable laser source with the single crystal SiC freespace coupled sensor to generate unambiguous sensor readings such as of temperature as the optical path length (OPL) of the SiC chip varies with changing conditions such as temperature. In particular, choice of a minimum two appropriate wavelengths via the tunable laser can generate the effect of a very large synthetic optical wavelength that can then magnify the unambiguous OPL of the chip, allowing measurement over a very wide range of measurement such as 25 C to 2000 C using the same sensor hardware. Specifically, an indirect two wavelength method is provided that takes SiC etalon measured reflectivity data for two independent but pre-designed wavelengths and converts this data into unambiguous co-sinusoidal sensing data with the varying sensing parameter such as temperature.

Previous works in Fabry-Perot SiC etalon-based sensors focused on using broadband optical sources that caused limitation in both hardware performance plus sensitivity of sensor. The approach using a tunable laser solves the prior art problems, in particular when using a near infrared wavelength band for telecom, i.e., centered at 1550 nm. Here, very broadband (e.g., 1500-1610 nm) tunable lasers are available with 0.001 nm tuning step accuracies, thus providing an excellent platform to calibrate and optimize the single crystal SiC sensor to generate unambiguous sensing data over a very broad sensing range using a time multiplexed tunable laser operation. Also provided is the use of two wavelength multiplexed lasers of two different wavelengths to simultaneously produce sensor data instead of the time multiplexed tunable laser method. Two wavelength tunable lasers can also be used in this setup instead of the two fixed wavelength lasers. Another benefit of the design using telecom wavelengths is that these wavelengths are human eye safe, as do note that freespace beams travel in the sensing zone.

The sensor because of its agile free-space coupling provides a multiple sensor design where the input beam is scanned using scanning and alignment mirrors to access any one of the independent SiC chips placed in the sensing zone. In effect, for N chips, a freespace 1×N optical switch is formed to transmit and receive sensor data from N chips, but using only one output photodetector.

The SiC sensor uses a self-imaging type fiber lens to launch the collimated Gaussian beam towards the SiC chip. A bulk lens is also used in the path to maintain collimation such that the Gaussian beam waist position (also the point of best collimation) lies near the SiC chip for proper etalon operation. Another benefit is the receive light efficiency is high and allows proper pointing and capture of light for photodetection via free-space photodetector. In effect, light loss is minimized in the design.

A heterodyne interferometric sensor design is also possible with the basic homodyne/baseband sensor using a variety of traditional frequency offset introducing methods such as via an acousto-optic device or Bragg cell. The heterodyne sensor design can provide high RF gain and lower noise photo-detection leading to higher sensitivities.

The invention also includes multi-wavelength signal processing techniques that make the sensor robust to maintaining ideal frontend processing conditions, a task impractical for hazardous conditions. The rest of the application describes the theoretical foundations of the sensor.

In summary, designed is a single crystal Silicon Carbide (SiC)-based minimally invasive smart optical sensor and signal processing suited for harsh environments and extreme high temperatures reaching 2500° C. The sensor due to the robust chemical and mechanical properties of single crystal SiC can be used in extreme pressure and corrosive chemical environments, in addition to extreme low temperatures like space and planetary exploration. The novel sensor design is based on an agile wavelength source, instantaneous single wavelength strong two-beam interferometry, full optical power cycle data acquisition, free-space targeted laser beam, multiple single crystal thick SiC optical frontend chips, and multi-wavelength signal processing for unambiguous temperature measurements to form a fast and distributed smart optical sensor system. An exemplary sensor can be built using a 1550 nm eye safe band tunable laser and a 300 micron coating-free thick single crystal SiC chip for extreme temperature sensing. Applications for the sensor include use in fossil fuel-based power systems, aerospace/aircraft systems, satellite systems, deep space exploration systems, and drilling and oil mining industries.

DETAILED DESCRIPTION OF THE INVENTION

Figure 1:
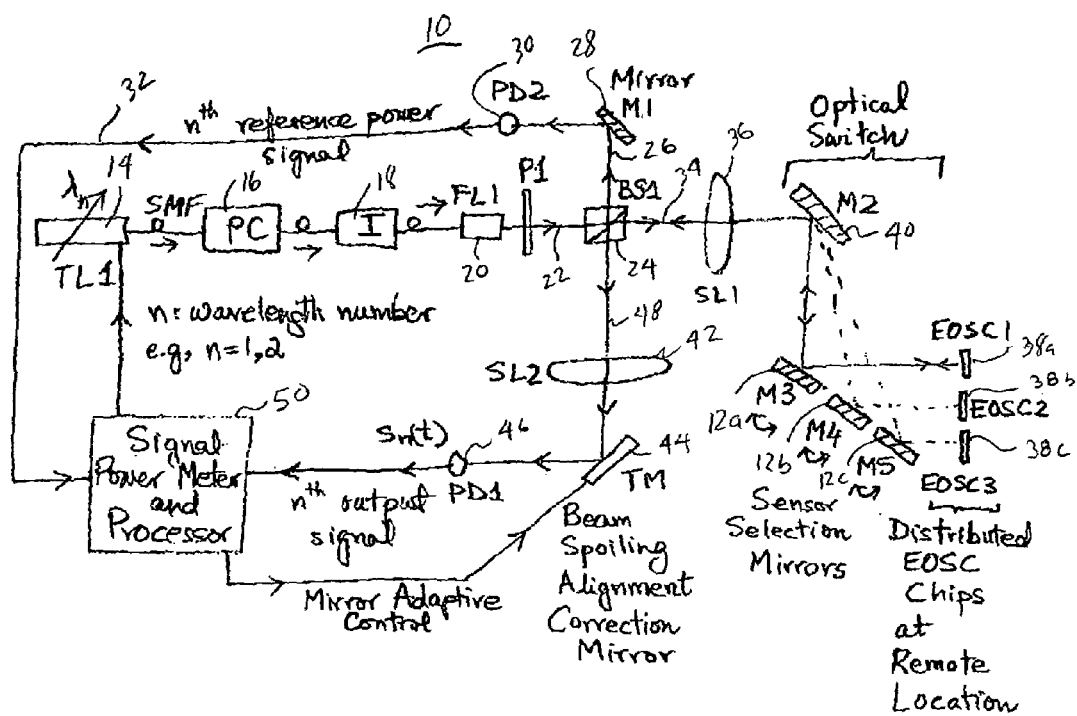
FIG. 1 is an exemplary embodiment of high temperature minimally invasive optical sensor using freespace interface optics, tunable laser, and selection and beam tracking mirror optics. The sample frontend is composed for example of three Etalon Optical Sensor Chips (EOSCs) using single crystal Silicon Carbide (SiC).

FIG. 1 shows an embodiment of a high temperature minimally invasive optical sensor 10 using freespace interface optics. The sample frontend is composed for example of three Etalon Optical Sensor Chips (EOSCs) 12a, 12b, 12c using, for example, single crystal Silicon Carbide (SiC). Light from a tunable laser 14 passes via fiber-optics such as a polarization controller (PC) 16 and isolator (I) 18 to exit via a fiber lens (FL1) 20 to produce a freespace beam 22 with its minimum Gaussian beam waist radius $w_i$ located at a distance $d_s$ from FL1, this distance also called the half-self imaging distance (see Martin van Buren and N. A. Riza, "Foundations for low loss fiber gradient-index lens pair coupling with the self-imaging mechanism," Applied Optics, LP, Vo.42, No.3, Jan. 20, 2003). This light then passes via a beam splitter BS1 24 to produce a reflected beam 26 that via mirror M1 28 enters a freespace coupled photodetector PD2 30 to produce a level electrical signal 32 indicating the power of the nth tuned wavelength of the laser 14. This information can be used to calibrate the sensor data. The straight beam 34 from BS1 24 passes via an bulk spherical lens SL1 36 of focal length F1. The distance between FL1 and SL1 is F1+$d_s$ and distance between SL1 and the sensor array plane where the chips EOSC1 38a, EOSC2 38b, and EOSC3 38c are placed is F1. SL1 36 makes sure that the minimum Gaussian beam waist is at the chip 38a, 38b, 38c location. The minimum beam waist position implies beam perfect collimation location and is ideal for placing the EOSCs 38a, 38b, 38c to get optimal etalon performance. The mirrors M2 40, M3 12a, M4 12b, M5 12c are 2-axis mirrors are adjusted to select the desired EOSC 38a, 38b, 38c and implement perfect alignment with the etalon chip. Note that each EOSC 38a, 38b, 38c can be positioned at the desired locations in the sensing zone such as a power plant or aircraft engine. An embodiment for the EOSC 38a, 38b, 38c is single crystal Silicon Carbide that acts as a natural etalon. Light reflected from the chosen etalon chip traces the path back via the mirrors and SL1 36 to reflect via BS1 24 towards spherical lens SL2 42 with focal length F2. The distance from SL2 42 to the EOSC 38a, 38b, 38c plane is ideally F2. The returning light 48 via SL2

42 then passes via the beamforming mirror TM 44 to strike a freespace coupled photodetector PD1 46. TM 44 is a beam spoiling correction mirror such as a deformable mirror that corrects wavefront distortions and keeps the returning beam aligned on PD1 46 to produce the optimal sensing signal based on OPL changes in the frontend etalon chip 38a, 38b, 38c. Because the EOSCs 38a, 38b, 38c can be mounted on various platforms that may have vibrations or other beam perturbing environmental effects such as air currents, pressure gradients, thermal gradients, the returning freespace beam from the sensing zone can suffer unwanted beam motions and wavefront distortions. Hence, for proper sensor operation, the returning beam 48 must strike the correct zone of the freespace photodetector 46 to produce equal gain over all sensing measurements. Note that as the etalon OPL changes due to some effect such as change in temperature, the reflected signal power varies and can undergo several power variation cycles. Thus to maintain proper sensor operation and calibration, PD1 46 must act with the same optical gain as data taken is gain sensitive. Hence the use of the TM 44 that is engaged depending on the EOSC 38a, 38b, 38c sensing zone scenario. The signal power meter (PM) and processor electronics 50 control the tunable laser 14, TM 44, M2 40, M3 12a, M4 12b, M5 12c, and PC 16 (not all connections shown in FIG. 1).

The optical power reflected from any Fabry-Perot Etalon and detected as an electrical signal from a photodetector is given by $i(t)=F(OPL)=\{(R1+R2+2\sqrt{R1R2}\cos(OPL)\}/\{(1+R1R2+2\sqrt{R1R2}\cos(OPL)\}$, where R1 and R2 are the etalon structure Fresnel Reflectivity Powers for the first and second interfaces/mirrors, respectively. Optical path length $OPL=\{4\pi/\lambda\}\{n(\lambda)d\}$, where $\lambda$ is the optical wavelength, d is the etalon thickness or distance between the two reflective mirror interfaces, and $n(\lambda)$ is the etalon material refractive index that may be wavelength dependent. For the embodiment of the single crystal SiC etalon, one fundamentally has air-SiC interfaces as the two mirrors. Given this situation, $R1=R2=R$, giving $F(OPL)=\{2R(1+\cos OPL)\}/\{1+R(R+2\cos OPL)\}$. It is clear that F(OPL) has a periodic cosine function (written as cos) within it, implying that F(OPL) will also show periodic behavior with increasing OPL. This leads to ambiguous readings of F(OPL) with changing OPL. One solution is to take F(OPL) data at two different wavelengths $\lambda 1$ and $\lambda 2$ by switching the tunable laser between the two wavelengths. Because the OPL at the two wavelengths will be different, the function F(OPL, $\lambda 1$) will have a phase shift with respect to the function F(OPL, $\lambda 2$). In practice, the current produced by the photodetector will be a scaled value of F(OPL) such as $i(t)=C\times F(OPL)$. For a given $\lambda 1$, the maximum and minimum values of the measured i(t) lets us calculate the scaling constant C. This is because measured $i(t)max=C\times F(OPL)max=C\times\{4R/(1+R)^2\}$ and since i(t)max and R are known by measurements, C is calculated. Now $F(OPL)=i(t)/C$, from which we can write an expression for $\cos(OPL)=[\{i(t)/C\}\{1+R^2\}-2R]/[2R\{1-i(t)/C\}]$. Thus for a given wavelength, the measured scaled photodetector current and measured R values can be used to generate cos(OPL) values that will produce the expected cosine function as the OPL changes due to an OPL changing parameter such as index change.

Consider the case for FIG. 1 where SiC EOSCs are used to form a spatially distributed temperature sensing network. It is well known that the refractive index of SiC is temperature (T) dependent. Thus as temperature T changes over a range of $T_{min}$ to $T_{max}$, the SiC etalon OPL changes modulo-$2\pi$ giving maximum to minimum periodic variations of the measured photo-current i(t) and hence also the calculated cos(OPL). For a chosen a $\lambda 1$ and a temperature range variation from $T_{min}$ to $T_{max}$, the OPL change can be written as: $\delta OPL=\{4\pi/\lambda 1\}\{n(\lambda 1, T_{max})d(T_{max}))\}-\{4\pi/\lambda 1\}\{n(\lambda 1, T_{min})d(T_{min})\}=2\pi N1+\theta$, where this cosine function goes through N1 full $2\pi$ cycles plus an additional phase shift of $\theta$. Next another wavelength $\lambda 2$ is chosen such that for the given fixed parameters of the EOSC and the same chosen temperature range $T_{min}$ to $T_{max}$, the OPL change over this temperature range is given as $\delta OPL(T)=\{4\pi/\lambda 2\}\{n(\lambda 2, T_{max})d(T_{max})\}-\{4\pi/\lambda 2\}\{n(\lambda 2, T_{min})d(T_{min})\}=2\pi N1+\pi+\theta$, indicating that at the $\lambda 2$ wavelength, OPL change includes an additional $\pi$ phase shift. When using these periodic data functions, this additional $\pi$ phase shift is the key condition to generate unambiguous temperature data over a wide temperature range. Assuming that the refractive index is essentially the same for the two wavelengths $\lambda 1$ and $\lambda 2$, using the prior expressions for OPL change at the two wavelengths, we can write $\lambda 2=\{\lambda 1\}[\{2\pi N1+\theta\}/\{2\pi N1+\pi+\theta\}]$. Hence, after choosing a certain $\lambda 1$ and taking photodetector measurements that then give the cos(OPL) function with the OPL change parameter (e.g., temperature), one must choose another measurement wavelength $\lambda 2$ by the derived expression $\lambda 2=\{\lambda 1\}[\{2\pi N1+\theta\}/\{2\pi N1+\pi+\theta\}]$. The options to proceed are as follows. One approach is to choose a $\lambda 1$ by tuning the laser such that for the given temperature range $T_{max}-T_{min}$, $\theta=0$, implying that the cos(OPL) function follows N1 complete $2\pi$ cycles with period $\delta T1$. Thus $T_{max}-T_{min}=N1\times\delta T1$ with N1 being a derived positive integer from measured photo-current data. Hence the required $\lambda 2$ becomes $\lambda 2=\{\lambda 1\}[N1/\{N1+1\}]$. Using the tunable laser, the desired $\lambda 2$ is achieved.

An alternate option to derive $\lambda 2$ is to choose the values for $T_{max}$ and $T_{min}$ for the given fixed $\lambda 1$ so that in the range $T_{max}$, $T_{min}$, $\theta=0$, implying that the cos(OPL) function follows N1 complete $2\pi$ cycles with period $\delta T1$. Again, $\lambda 2$ becomes $\lambda 2=\{\lambda 1\}[N1/\{N1+1\}]$. Finally, we can make an approximation for $\lambda 2$ if $\theta<<2\pi N1$ implying that $\lambda 2\approx\{\lambda 1\}[N1/\{N1=1\}]$. Consider an example FIG. 1 sensor using single crystal SiC at 80 $\lambda 1=1550$ nm that at gives a $\delta T1=22$ C with N1=40 cycles over a room temperature $T_{min}$ of 26° C. to a $T_{max}$ of 880° C. In this case, we must choose a $\lambda 2=(1550$ nm) $(40/41)=1512.2$ nm to provide unambiguous temperature measurement between $T_{min}$ of 26° C. to a $T_{max}$ of 880° C. This new $\lambda 2$ can easily be achieved using a state of the art telecom band tunable laser. Note that using the two wavelength data acquisition and processing method, the relative phase shift for the two different wavelength data points at a given temperature in the cos(OPL) plot versus temperature will show a maximum phase shift up-to $\pi$. Hence, throughout this $T_{max}$, $T_{min}$ temperature range, the FIG. 1 sensor data will be unambiguous.

Hence, this principle of taking multiple independent sensing data at different wavelengths by simply changing the wavelength using the tunable data can generate robust sensor data leading to unambiguous sensor readings over a very wide sensing range. Note that in the case of SiC, the thickness d will also change as temperature changes over a very wide range (e.g., 26 C to 2000 C), hence the OPL in the SiC etalon is effected by both the refractive index change and thickness change. Because the two changes are independent, the temperature period for the function $F\{OPL(T), \lambda\}$ with temperature can be different in different broad temperature ranges. This in-turn also can make the measured $F\{OPL(T), \lambda\}$ truly unique for each wavelength making unambiguous temperature measurements intrinsic in the physics of the sensor. Also note that similar mathematics and procedures follow when the etalon Fresnel Power Reflection Coefficients R1 is not equal to R2.

Do note that the single crystal SiC EOSC can also be used for other measurements such as pressure and gas species detection, plus chemical and bio-sensing. The SiC crystal can also be coated with various films such as porous films for gas detection. In addition, any etalon chip can be used with the FIG. 1 sensor system 10 that provides a minimally invasive means of distributed sensing in a high temperature or otherwise hostile zone. True benefits of a targeted freespace laser beam is exploited in the FIG. 1 sensor, keeping all the sensitive optics and electronics away and safe from the hostile environment. Only the SiC EOSCs 38a, 38b, 38c are present in the sensing zone and these can withstand hostile conditions. In addition, provided is also a mechanism to protect the optical surfaces of the SiC EOSC 38a, 38b, 38c by enclosing it a glass windowed enclosure to protect it from dirt and other particles that can spoil the optical surface quality.

Figure 2:
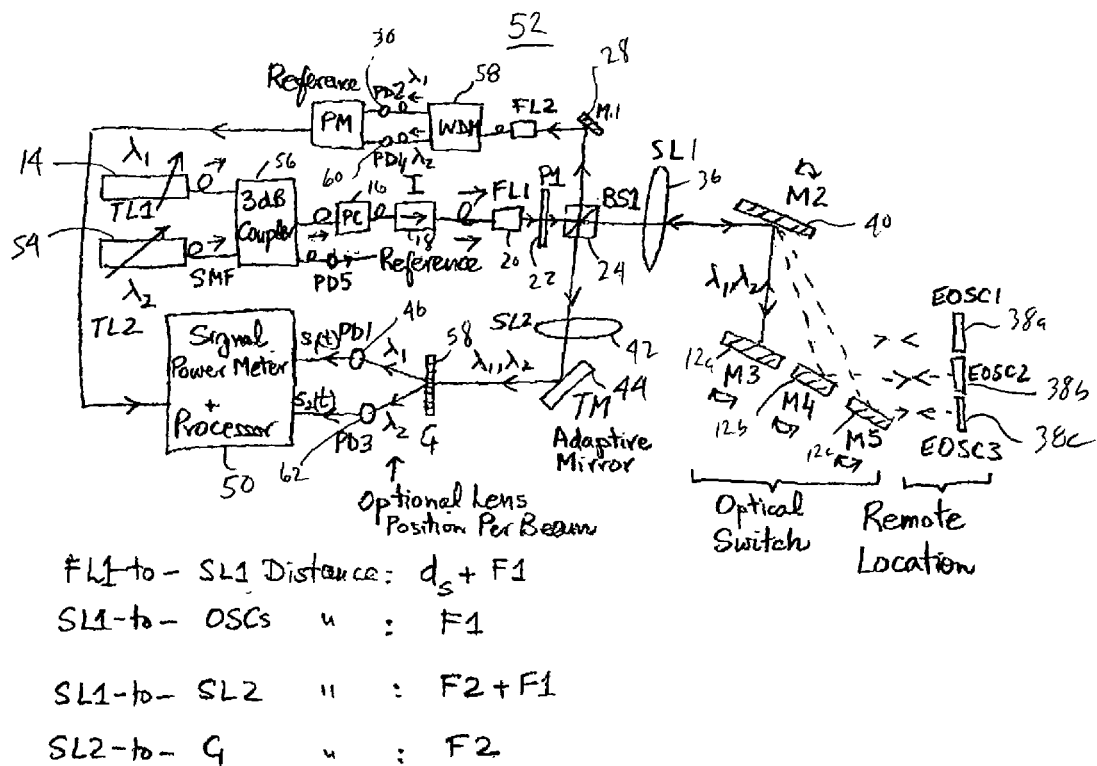
FIG. 2 is an alternate embodiment of a high temperature minimally invasive optical sensor using two independent tunable lasers or two different but fixed wavelength lasers.
Figure 3:
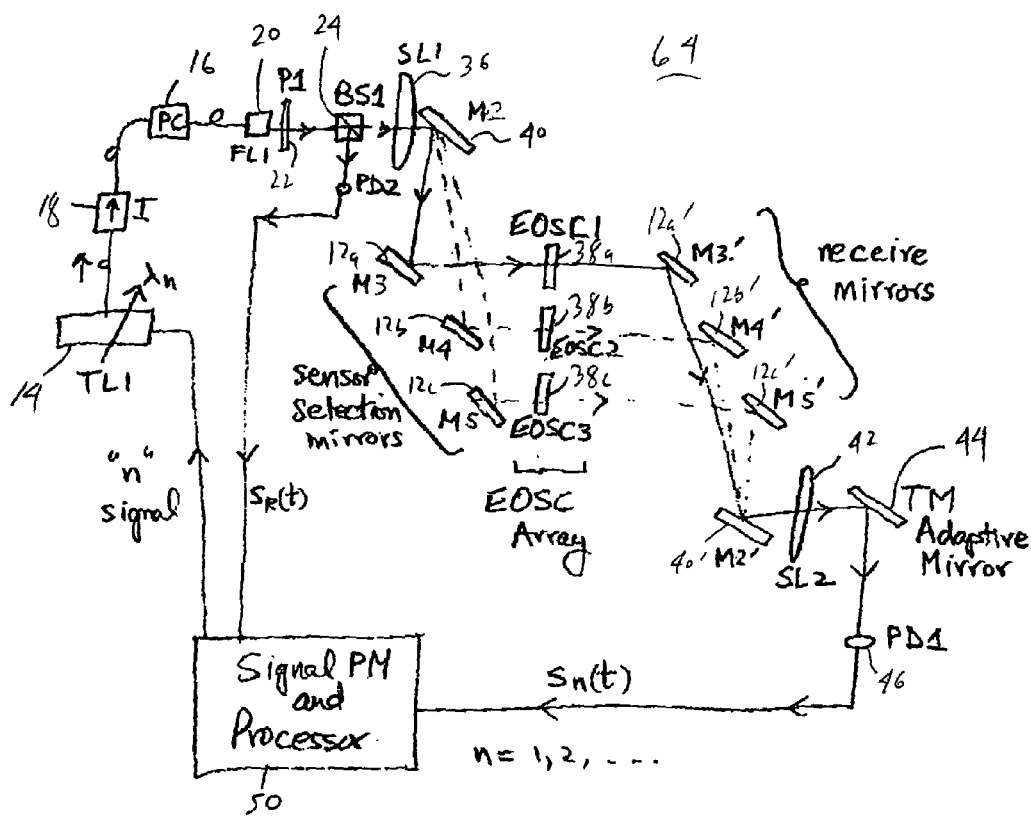
FIG. 3 is an alternate embodiment of a high temperature minimally invasive optical sensor using transmissive etalon sensors and transmissive receive optics.

The FIG. 1 sensor uses a single tunable laser 14 to make time multiplexed sensing measurements. An alternative is to use two simultaneous independent tunable lasers or fixed but different wavelength lasers to act as the sensor source. FIG. 2 shows such a two wavelength sensor system 52 that can provide instantaneous sensing measurements where fast sensing speed is required. The two wavelengths via the tunable lasers 14, 54 (or fixed but different lasers) are combined via a 3-dB 2×2 fiber-optic coupler 56. At the reference output port, a WDM fiber-optic device 56 is used to separate the two wavelengths to direct to the two freespace coupled photodetectors 30, 60. At the signal input port, a WDM freespace grating device G 58 is used to separate the two wavelengths to direct to the two freespace coupled photodetectors 46, 62. FIG. 3 shows an alternate embodiment of high temperature minimally invasive optical sensor 64 using transmissive etalon sensors and transmissive receive optics. In this case, light transmitted via the etalon chips 38a, 38b, 38c is collected for sensor processing. Additional mirrors M2' 40', M3' 12a', M4' 12b', M5' 12c', are required for beam selection, alignment, and tracking. Note that in this case, the etalon transmissive Fresnel power coefficient is used for sensor signal processing.

Figure 4:
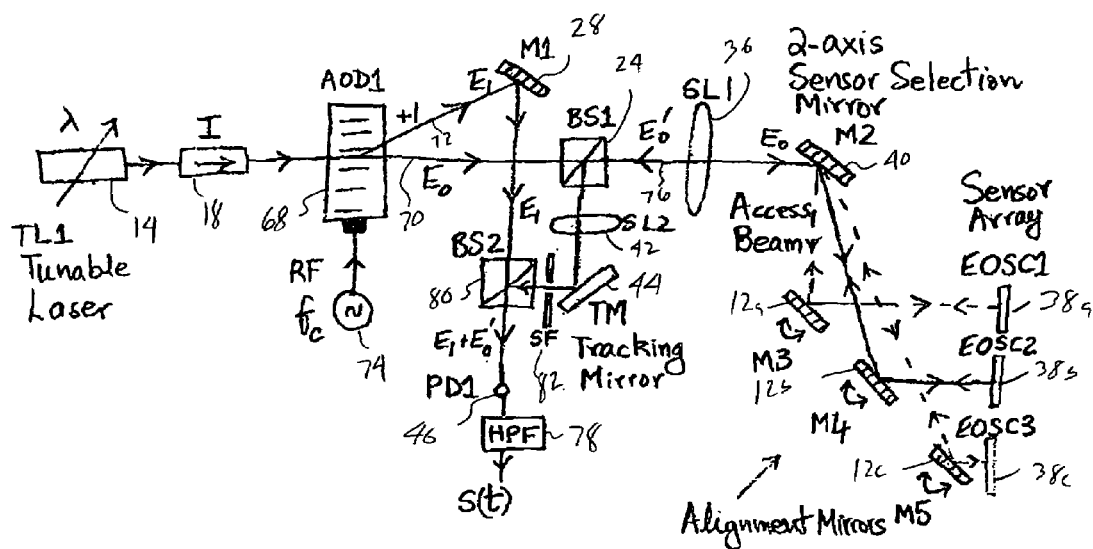
FIG. 4 is an alternate embodiment of a high temperature minimally invasive optical sensor using heterodyne interferometry via a single Bragg cell.

FIG. 4 shows an alternate embodiment of high temperature minimally invasive optical sensor using heterodyne interferometry via a single Bragg cell driven by an RF frequency $f_c$. The tunable laser strikes a Bragg cell or acousto-optic device (AOD1) 68 that produces a straight DC beam 70 and a +1 order positive $f_c$ Doppler shift deflected beam 72 that acts as a local oscillator (LO) 74 to mix with the signal sensing beam 76 from the etalon to produce an RF signal s(t) whose amplitude value gives the desired sensing signal. An optional High Pass Filter (HPF) 78 at $f_c$ can be used to reduce noise in the signal s(t). Heterodyne interferometry can be used to improve the sensitivity of the sensor system 66. The beam splitter BS2 80 is used to combine the LO+1 order beam 72 with the DC sensing beam 76 from the etalon. A spatial filter SF 82 can be used to clean the DC sensing beam. The heterodyne design requires that the optical path length difference between the DC sensing beam 76 and the +1 order beam 72 when incident on the photodetector PD1 46 does not exceed the coherence length of the laser source 14. Since present day tunable lasers can have extremely small spectral widths (<0.001 nm), their coherence lengths can be very large (e.g., many meters); hence the distance between the EOSC chips 38a, 38b, 38c and the processor can be large. Also, the +1 order beam 72 can be sent into a long reference path (e.g., even a fiber path) to equalize DC beam and +1 beam path lengths.

Figure 5:
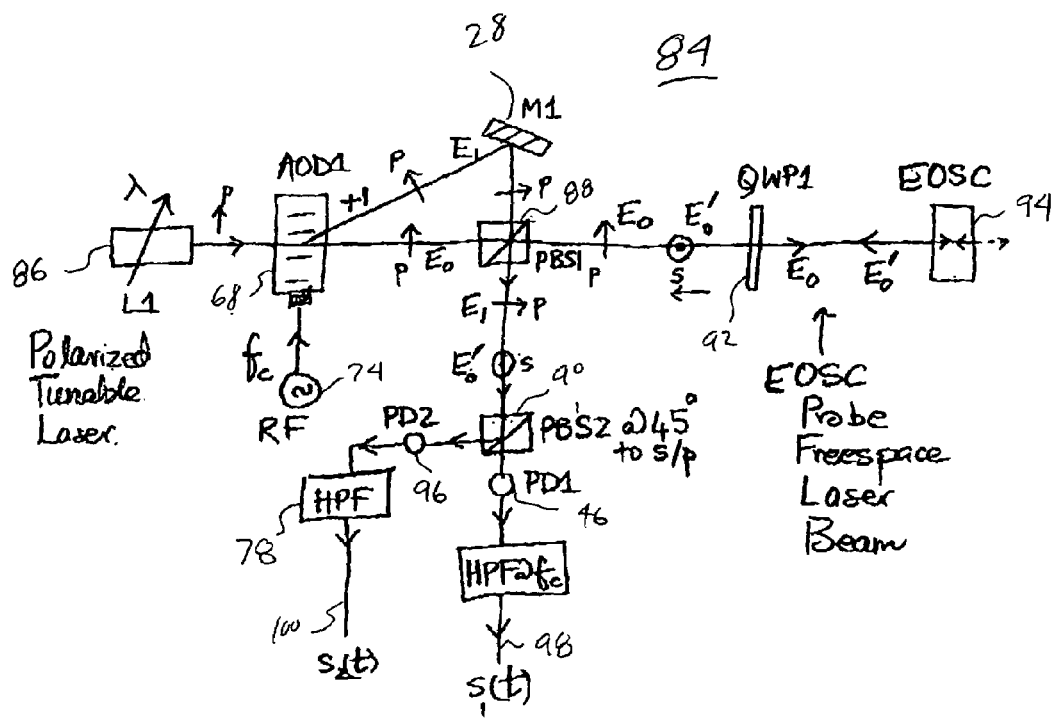
FIG. 5 is an alternate embodiment of a high temperature minimally invasive optical sensor using heterodyne interferometry and a polarization-based efficient design.

FIG. 5 shows an alternate embodiment of high temperature minimally invasive optical sensor 84 using heterodyne interferometry and a polarization-based efficient design. Compared to previous designs, only one EOSC 94 is used and no TM adaptive mirror is shown. The sensor 84 includes a polarized tunable laser 86, a acousto-optic device (AOD1) 68, a polarizing beam splitter (PBS1), and a quarter wavelength plate (QWP1) 92 in a light path to a sensing device, such as the EOSC 94. Multiplexing of two orthogonal polarizations is used for the different paths, including a polarization beam splitter PBS2 90 oriented at 45 degrees to the two linear beams to act as a 50:50 beam splitter to get two sensing signals $s_1(t)$ 98 and $s_2(t)$ 100 that are 180 degrees out of phase. $s_1(t)$ and $s_2(t)$ can be used for balanced differential processing for the sensor 84, providing improvements in sensor signal-to-noise (SNR) ratios.

Figure 6:
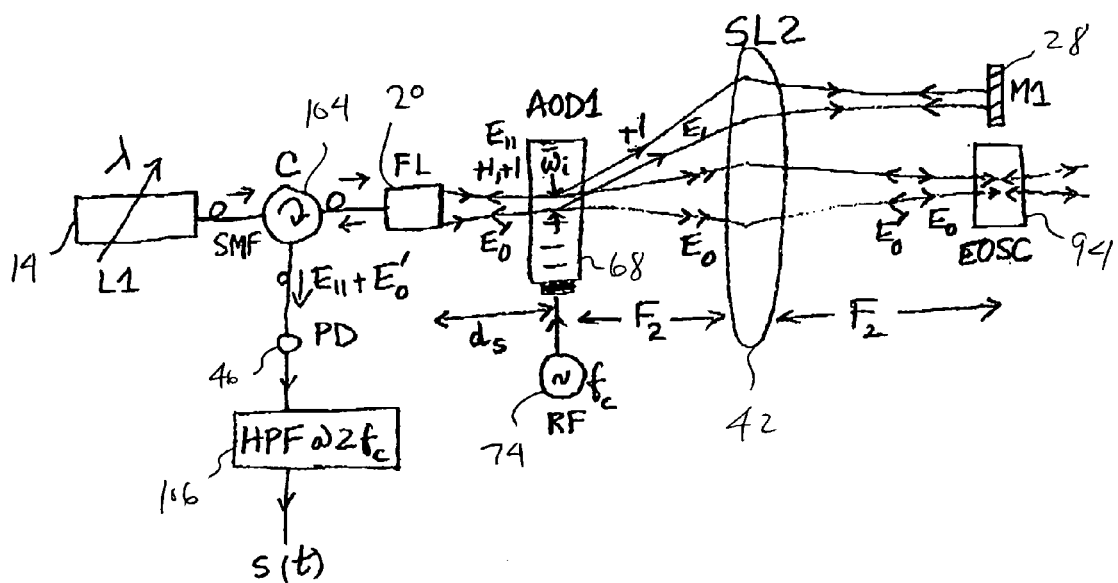
FIG. 6 is an alternate embodiment of a high temperature minimally invasive optical sensor using heterodyne interferometry and a double Bragg diffraction in-line design.

FIG. 6 shows an alternate embodiment of a high temperature minimally invasive optical sensor using heterodyne interferometry and a double Bragg diffraction in-line design. The sensor 102 includes a circulator directing light to the sensing device, such as the EOSC 94, and to redirect received light into photodetector 46 to provide an output signal filtered through a high pass filter 106. In this case, the signal s(t) is on a $2f_c$ RF and both beams pass through the same lens SL2 42, making this sensor design highly phase stable. Also the system uses fiber-optics for receive light processing.

Figure 7:
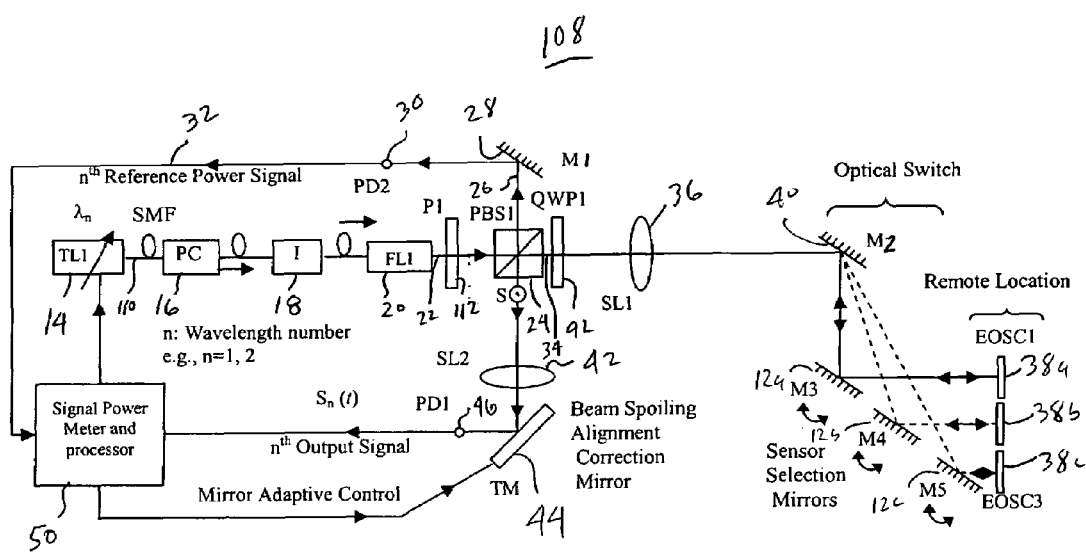
FIG. 7 is an alternate embodiment of extreme environment minimally invasive optical sensor using single crystal SiC.

FIG. 7 shows a high temperature minimally invasive optical sensor. The sample frontend is composed for example of three weak Etalon Optical Sensor Chips (EOSCs) 38a, 38b, 38c using, for example, a single crystal SiC's. Sapphire could be another alternate crystal material for the EOSCs 38a, 38b, 38c. Light from a tunable laser 14 passes via fiber-optics 110 such as a polarization controller (PC) 16 and isolator (I) 18 o exit via a fiber lens (FL1) 20 to produce a freespace beam 22. This light then passes via a polarizer P1 112 at a slight angle to the horizontal or p-polarization direction) and a polarizing beam splitter PBS1 24 to produce an s or vertically polarized reflected beam 26 that via mirror M1 28 enters photodetector PD2 30 whose output is used to access sensor efficiency. The straight linearly (or horizontally) polarized beam 34 from PBS1 24 passes via a quarter-wave plate QWP1 92 (or 45 degree power Faraday rotator) and a bulk spherical lens SL1 36. The use of QWP1 92 gives polarization insensitivity to the EOSCs 38a, 38b, 38c configured using SIC's sensing operations as circularly polarized light strikes the SiC crystal that can possess some birefringence. The lenses 36, 42 are used to reduce beam spreading loss. The mirrors M2 40, M3 12a, M4 12b, M5 12c are 2-axis mirrors that are adjusted to select the desired EOSC 38a, 38b, 38c and implement normal incidence alignment with the EOSCs 38a, 38b, 38c. All mirror optics can also be made of high temperature capability SiC foam material such as used for space telescope applications. Because of its high refractive index (e.g., 2.57), single crystal SiC chip acts as a natural weak etalon in air with about 20% optical reflectivities at the two air-SiC interfaces. Light reflected from the chosen etalon chip traces the path back via the mirrors M2 40, M3 12a, M4 12b, M5 12c and SL1 36 to reflect via PBS1 24 as vertically polarized light towards spherical lens SL2 42. The returning light via SL2 42 then passes via the beamforming mirror TM 44 to strike a freespace coupled photodetector PD1 46. TM 44 is a beam spoiling correction mirror such as a deformable mirror that as needed corrects wavefront distortions and keeps the returning beam aligned on PD1 46 to produce the optimal sensing signal based on optical path length changes in the frontend etalon chip. Because the EOSCs 38a, 38b, 38c can be mounted on various platforms that may have vibrations or other beam perturbing environmental effects such as air currents, pressure gradients, thermal gradients, the returning freespace beam from the sensing zone can suffer unwanted beam motions and wavefront distortions. Hence, for proper sensor operation, the returning beam must strike the active detection zone of the freespace large area (e.g., a few millimeter diameter) point photodetector. Note that as the SiC crystal etalon optical path length changes due to change in sensing zone temperature, the etalon reflected signal power varies and can undergo several power variation cycles. To maintain proper sensor operation and calibration as explained next, the instantaneous PD1 46 produced power level signal is normalized before signal processing required to compute the sensed temperature. This normalization is done in a no-moving parts electronic fashion by sweeping the laser wavelength to synthesize optical path length changes and then measure the nearest power maximum and minimum and using these max/min data for the instantaneous reading normalization, hence giving robustness to the sensor operations.

The non-invasive sensor utilizes the SiC crystal Fabry-Perot cavity interference to extract sensing information. Specifically, classic expression for the reflectance from a Fabry-Perot type interference due to multiple reflections between two parallel dielectric plates with front surface power reflection of R1 and back surface power reflectance $R_2$ is given by [Eric Udd, *Fiber Optic Sensor*, Wiley Series in Pure and Applied optics, (John Wiley & Sons, Inc. New York, 1991)]:

$$R_{FP} = \frac{R_1 + R_2 + 2\sqrt{R_1 R_2} \cos\phi}{1 + R_1 R_2 + 2\sqrt{R_1 R_2} \cos\phi}. \quad (1)$$

Note that the SiC chip also acts as a natural optical window that can be placed as a sealing window separating an extreme temperature hazardous zone from a safe lower hazard zone. In this case for the single crystal SiC chip, $R_1$ is the reflectivity provided by the air-SiC interface facing the light beam present in the preferably friendlier zone while $R_2$ is the reflectivity provided by the SiC-air interface present in the hazardous extreme temperature zone. It is also possible to place the SiC chip as a mounted chip exposed to the entire extreme temperature zone with both crystal interfaces engaging the light beam equally exposed to high temperature.

An optical path length (OPL) parameter in radians for the sensor is defined as:

$$OPL = \phi = \frac{4\pi n(\lambda) d}{\lambda}, \quad (2)$$

Where $\phi$ is the round-trip propagation phase in the SiC crystal of thickness d and refractive index n at a tunable laser wavelength $\lambda$ at normal incidence. It can be shown that for Eq. 1 the maximum value of the reflectivity $R_{FP_{max}}$ occurs when $\cos(\phi)=1$ and the minimum value of reflectivity $R_{FP_{min}}$ occurs when $\cos(\phi)=-1$ where:

$$R_{FP_{max}} = \frac{R_1 + R_2 + 2\sqrt{R_1 R_2}}{1 + R_1 R_2 + 2\sqrt{R_1 R_2}} = \frac{(r_1 + r_2)^2}{(1 + r_1 r_2)^2} \quad (3)$$

$$R_{FP_{min}} = \frac{R_1 + R_2 - 2\sqrt{R_1 R_2}}{1 + R_1 R_2 - 2\sqrt{R_1 R_2}} = \frac{(r_1 - r_2)^2}{(1 - r_1 r_2)^2}$$

Note that the Eq. 3 expressions are simplified by using the relations $R_1 = r_1^2$ and $R_2 = r_2^2$ where $r_1$ and $r_2$ are the Fresnel amplitude reflection coefficients for the chip front and back interfaces, respectively. Given the input light travels through air with refractive index $n_0=1$, SiC chip with index n, and external hazardous zone with index $n_1$, the Fresnel power reflection coefficients for the SiC chip front and hazard zone interfaces can be written as:

$$R_1 = |r_1|^2 = \frac{(n - n_0)^2}{(n + n_0)^2} \quad (4)$$

$$R_2 = |r_2|^2 = \frac{(n_1 - n)^2}{(n_1 + n)^2}.$$

Traditionally, a high quality Fabry-Perot cavity with deep highly narrow notches (or peaks) is designed by making high reflective (>95% reflectivity) internal surfaces of the Etalon. For 6H—SiC in the near infrared region with n=n 2.57 [http://www.ioffe.rssi.ru/SVA/NSM/Semicond/SiC/optic.html; Goldberg Yu., Levinshtein M. E., Rumyantsev S. L. in *Properties of Advanced SemiconductorMaterials GaN, AlN, SiC, BN, SiC, SiGe*. Eds. Levinshtein M. E., Rumyantsev S. L., Shur M. S., John Wiley & Sons, Inc., 93-148, New York, 2001] and the SiC chip placed in air, using Eqn.4 gives $R_1=R_2=R=0.193$. Although single crystal SiC acts as a natural etalon, it is also a very weak etalon in air due to its near 19% reflectivity at the crystal interfaces. In fact, the classic Fabry-Perot effect is so weak that the interaction of laser light with the natural SiC crystal in air can be well approximated by classic two beam interferometry. This can be verified by the fact that the first light beam reflected off the first air-SiC interface has 19.3% (as R=0.193) of the input beam laser power while the beam reflected by the second SiC-Air interface and returning to the sensor detector as a second optically delayed beam has a 12.5% of input laser power [as $R(1-R)^2=0.125$]. The third beam returning to the sensor detector after three reflections and double delay due to the SiC-Air interfaces and has only a 0.47% power of the original input laser beam. Hence for the SiC crystal-based sensor, one can use the first two beams from the SiC chip as the dominant terms for optical interference leading to the classic two-beam interferometry situation. Futhermore, if the SiC chip is placed in a hazard zone where the hazard zone contains materials other than air, $R_1$ and $R_2$ will further decrease making the two-beam interference approximation even stronger. Using this SiC specific two-beam approximation, the instantaneous detected optical power can be rewritten as:

$$P_m = K \cdot R_{FP} \approx K[R_1 + (1-R_1)^2 R_2 + 2(1-R_1)\sqrt{R_1 R_2} \cos\phi] \quad (5)$$

where $R_{FP}$ is the instantaneous optical reflectivity of the basic frontend SiC Fabry-Perot element while K is a constant that depends upon the experimental conditions such as input power, power meter response gain curve, beam alignments, and losses due to other optics. In addition, optical noise in the system with time can also change the amount of light received for processing, thus varying the constant K.

The overall goal of the optical sensor is to use a minimally invasive technique to measure a single crystal SiC chip-based optical parameter that can then provide the temperature at the remoted SiC chip position. As seen from Eqn.5, the optical phase $\phi$ of the SiC chip is an appropriate sensor parameter for measurement and sensor processing. Eqn.5 also shows that the SiC sensor measured $P_m$ power values will approximate a sinusoidal functional behavior. This behavior is favorable for further data processing that will utilize phase difference values of these measured sinusoidal optical power data signals. Do note that exact expressions for the $P_{m_{max}}$ and $P_{m_{min}}$ values can be given as in these cases $\cos(\phi)=1$ (for a maximum) and $\cos(\phi)=-1$ (for a minimum). These instantaneous $P_{m_{max}}$ and $P_{m_{min}}$ are given by:

$$P_{m_{\max}} = K R_{FP_{\max}} = K \frac{R_1 + R_2 + 2\sqrt{R_1 R_2}}{1 + R_1 R_2 + 2\sqrt{R_1 R_2}} \quad (6)$$

$$P_{m_{\min}} = K R_{FP_{\min}} = K \frac{R_1 + R_2 - 2\sqrt{R_1 R_2}}{1 + R_1 R_2 - 2\sqrt{R_1 R_2}}.$$

Measurement of these localized maximum and minimum optical power values is important for normalizing the measured raw $P_m$ data to generate the measured $\cos(\phi)$ function that cannot exceed ±1 values. This measured $\cos(\phi)$ function using the normalization of the raw $P_m$ data is given as:

$$\cos(\phi) = 2 \frac{P_m - 0.5 \times (P_{m_{\max}} + P_{m_{\min}})}{P_{m_{\max}} - P_{m_{\min}}}. \quad (7)$$

where $P_{m_{max}}$ and $P_{m_{min}}$ are the sensor measured localized optical power maximum and minimum values, respectively. The measured optical phase and phase difference values will then be used to compute the temperature measured by the sensor. Note that based on the dynamic range of the single crystal SiC defined OPL parameter $\phi$ change due to temperature, the $\cos(\phi)$ sinusoidal behavior can be over many cycles. Furthermore, based on the specific experimental conditions, the values of $P_{m_{max}}$ and $P_{m_{min}}$ can change for each specific cycle. Hence for calculating the OPL via an instantaneous $P_m$ for a given sensing parameter condition, the $P_{m_{max}}$ and $P_{m_{min}}$ values within the respective OPL change single cycle should be used. Thus, for proper sensor operation of determining an instantaneous $\cos$ (OPL) and hence the instantaneous measurement parameter of temperature, the numerical operation of Eqn. 7 needs to be implemented. This operation is done by measuring PD1 provided three power levels; namely, optical power $P_m$ at the chosen wavelength and then measuring the closest (i.e., within one optical power min/max cycle), the values of $P_{m_{max}}$ and $P_{m_{min}}$. Key to these measurements is that the scaling factor K should be the same for all three measurements. As mentioned before, K depends on various experimental parameters such as laser power and beam alignment that can be maintained during a given measurement set. In addition, $P_m$, $P_{m_{max}}$, $P_{m_{min}}$ depend of the instantaneous values of $R_{FP}$, $R_{FP_{max}}$, $R_{FP_{min}}$, respectively. Note from Eqn.4 that $P_{m_{max}}$, $P_{m_{min}}$ only depend on the SiC etalon interface Fresnel power coefficient values of $R_1$ and $R_2$. In-turn, $R_1$ and $R_2$ depend on the instantaneous refractive index n of SiC and the refractive indices of the chip front (i.e., $n_0$) and back-face (i.e., $n_1$) materials. On the other hand as seen from Eq.1, $P_m$ not only depends on the instantaneous values of $R_1$ and $R_2$, but also depends on the $\cos$ (OPL) value where the OPL term contains not only the instantaneous refractive index of SiC, but also the instantaneous SiC chip thickness d and the optical wavelength $\lambda$ set for the tunable laser. Here-in lies the method to rapidly measure the instantaneous values $P_{m_{max}}$, $P_{m_{min}}$ for a given measured instantaneous $P_m$ at the chosen wavelength. Specifically, after recording $P_m$, the tunable laser is rapidly swept in wavelength about $\lambda$ to make $\cos(OPL)=1$ and thus produce a $P_{m_{max}}$ measurement. Similarly, the tunable laser is swept in wavelength about $\lambda$ to make $\cos(OPL)=-1$ and thus produce a $P_{m_{min}}$ measurement. As all three PD1 power measurements are now available, Eqn.7 is solved to get a value for the instantaneous $\cos(OPL)$ that will undergo signal processing to determine the sensing parameter of temperature. A key condition for the accuracy and robustness of this normalization process is that the instantaneous SiC refractive index n over the wavelength sweep range is essentially constant, thereby keeping R constant for all three PD1 power measurements of $P_m$, $P_{m_{max}}$, $P_{m_{min}}$. It is also important that all three measurements are taken for the same exact experimental conditions (apart from wavelength) so that K and T are the same during this measurement set. One can study the effect of changing wavelength on the SiC refractive index by differentiating the OPL $\phi = \{4\pi/\lambda\}$ $\{n \, d\}$ with respect to the wavelength. The maximum wavelength change is required when either $P_m = P_{m_{max}}$ or $P_m = P_{m_{min}}$. In both these cases, a maximum $d\phi = \pi$ is required to change the PD1 power reading from the maximum to minimum or vice versa. For 6H-SiC single crystal material, the change in refractive index in the infrared band (e.g., 1500-1600 nm) is very small, e.g., <0.01%. For example, assuming a 0.01% change in refractive index for a 300 μm thick SiC chip with a refractive index of 2.57 at a wavelength of 1550 nm, , a small <1 nm range wavelength sweep of an eye safe 1550 nm band tunable laser will be sufficient to generate the required $P_{m_{max}}$ and $P_{m_{min}}$ values of light power required for normalization (via Eqn.7) of sensor instantaneous $P_m$ data.

For another set of new $P_m$, $P_{m_{max}}$, $P_{m_{min}}$ measurements for perhaps a different K (scaling constant effected by for instance receiver beam alignment) and T (i.e., temperature in hazardous zone) situation, a new $\cos(OPL)$ can be computed that is also correctly normalized for further signal processing. Thus, each near instantaneous three power set reading of $P_m$, $P_{m_{max}}$, $P_{m_{min}}$ is self-normalized to give the appropriate $\cos(OPL)$ data. If the values of K and R (due to possible change in SiC front and back interface Fresnel reflection coefficient parameters) fluctuate over different instantaneous 3-reading power sets, the peak modulation swing of the PD1 power cycle may change but the $\cos(OPL)$ data due to the self-normalization process from the sensor system is still accurate and robust for further signal processing. This attribute of the sensor is particularly attractive for fossil fuel applications where the sensor frontend SiC chip will be exposed to extreme mechanical and chemical effects that can alter receive beam alignments and also change refractive index of the medium surrounding the SiC chip that will cause a change/decrease in the Fresnel power coefficients of the SiC chip. Because the sensor signal processing and operations is robust to such changes, a powerful sensor can be realized for extreme environments. This attribute is all the more powerful when compared to standard Fabry-Perot-based sensors using broadband light and power spectrum measurements where the Fabry-Perot etalon must maintain its given spectral shape throughout sensor operations. Hence any changes in Fresnel coefficients will drastically effect the quality of the spectral filter function that will make detection of the shifts of the spectral maxima/minima all the more difficult. Recall that shape Fabry-Perot filter functions require highly reflective etalon interfaces, a key limitation in extreme fossil fuel applications where these interface reflectivities can severely degrade with extreme and cycle temperature swings.

The instrument can also be calibrated in a continuous mode as explained next. In this case, wavelength tuning is not required to generate the $P_{m_{max}}$ and $P_{m_{min}}$ values required for normalization. Instead, the sensing parameter such as temperature is swept over the desired sensing zone that causes the SiC refractive index n and chip thickness d to change that in-turn causes the required max/min cos(OPL) change to produce naturally induced $P_{m_{max}}$ and $P_{m_{min}}$ values at PD1. In this case, once all the $P_m$ data is recorded over the whole sensor calibration temperature range, $P_{m_{max}}$ and $P_{m_{min}}$ values within a given one cycle zone are used to normalize all the $P_m$ values within this given one cycle power data. In this special case, it must be shown that $P_{m_{max}}$ and $P_{m_{min}}$ remain constant over any one power variation cycle for the SiC chip.

Now consider the sensor used for measuring some arbitrary temperature T that induces changes in both refractive index and thickness of the SiC chip. The variation of chip refractive index thickness product or n×d induces a change in the PD1 detected optical power where:

$$\cos\{\phi(T)\} = \cos\left\{\frac{4\pi n(T)d(T)}{\lambda_1}\right\} = \left\{2\frac{P_m - 0.5 \times (P_{m_{\max}} + P_{m_{\min}})}{P_{m_{\max}} - P_{m_{\min}}}\right\}, \quad (8)$$

$$\phi(T) = \cos^{-1}\left\{2\frac{P_m - 0.5 \times (P_{m_{\max}} + P_{m_{\min}})}{P_{m_{\max}} - P_{m_{\min}}}\right\}. \quad (9)$$

Here $\lambda_1$ is the wavelength of operation. For a given instantaneous temperature T of the SiC chip remotely placed in the sensing environment of temperature T, PD1 records the three optical power levels $P_m$, $P_{m_{max}}$, $P_{m_{min}}$ (as mentioned earlier), and hence $\phi(T)$ can be computed. To calibrate the sensor, this procedure is repeated for the desired temperature range of $T_{min}$ to $T_{max}$. The sensor provided $\phi(T)$ phase value change from the minimum temperature to the maximum temperature can be expressed as:

$$\Delta\phi_1 = \left\{\frac{4\pi n(T_{\max})d(T_{\max})}{\lambda_1}\right\} - \left\{\frac{4\pi n(T_{\min})d(T_{\min})}{\lambda_1}\right\} = 2\pi m + \sigma_1. \quad (10)$$

Here, because of the rather large (e.g., 300 microns) thickness of the SiC chip, $\Delta\phi_1$ is expected to have m number of $2\pi$ phase cycles plus a possible fixed phase value of $\sigma_1$. Because of the presence of multiple cycles, a phase ambiguity arises in the sensor data obtained using $P_m$ data at $\lambda_1$. This phase ambiguity can be removed by measuring the sensor phase $\phi(T)$ at another carefully selected wavelength $\lambda_2$. This wavelength is selected such that the total phase shift in going from $T_{min}$ to $T_{max}$ is increased by $\pi$ and given by:

$$\Delta\phi_2 = \quad (11)$$

$$\left\{\frac{4\pi n(T_{\max})d(T_{\max})}{\lambda_2}\right\} - \left\{\frac{4\pi n(T_{\min})d(T_{\min})}{\lambda_2}\right\} = 2\pi(m + 0.5) + \sigma_1.$$

Note that the refractive index is assumed to be the same for wavelengths $\lambda_1$ and $\lambda_2$. Based on earlier reported experimental data for 6H-SiC in the near infrared band, this approximation is indeed valid, particularly when the two wavelengths are within for example 100 nm of each other. Solving Eq. 10 and Eq.11 gives:

$$\lambda_2 = \lambda_1 \frac{2\pi m + \sigma_1}{2\pi(m + 0.5) + \sigma_1}. \quad (12)$$

Eq. 12 is used to select the second wavelength of operation for the temperature sensor. Note that the additional phase shift $\sigma_1$ can be made zero by either selecting wavelength $\lambda_1$ such that the total phase shift is an integral multiple of $2\pi$ or by selecting the $T_{min}$ and $T_{max}$ such that $\sigma_1$ vanishes. In these cases with $\sigma_1=0$, Eq. 12 can be rewritten as:

$$\lambda_2 = \lambda_1 \frac{m}{m + 0.5}. \quad (13)$$

In summary, for a given temperature T, the sensor must generate PD1 provided $P_m$, $P_{m_{max}}$, $P_{m_{min}}$ optical power data set values at Eqn.13 based two pre-selected optical design wavelengths of $\lambda_1$ and $\lambda_2$. These power values are used to compute the sensor phase values of $\phi_1(T)$ and $\phi_2(T)$ at the temperature T. This process is repeated for the entire temperature range of $T_{min}$ to $T_{max}$. The sensor phase difference $\Delta\phi(T)=\phi_1(T)-\phi_2(T)$ is also calculated using the $\phi_1(T)$ and $\phi_2(T)$ data. A unique value of $\Delta\phi$ and $\phi_1(T)$ (or $\phi_2(T)$) exist for each temperature value eliminating the sensor phase ambiguity problem. During sensor calibration process, the $\Delta\phi$, T, $\phi_1(T)$ (or $\phi_2(T)$) values are stored. During sensor real-time temperature sensing operations, $\Delta\phi$ and $\phi_1(T)$ (or $\phi_2(T)$) are measured and matched to the unique T in the computer table that gives the same values for $\Delta\phi$ and $\phi_1(T)$ (or $\phi_2(T)$. Because today's commercial tunable lasers can be reset quickly (e.g., 1 ms) and accurately (e.g., within 0.01 nm), the sensor can quickly provide the desired sensing parameter, i.e., temperature value where the SiC chip is remotely placed.

Figure 8:
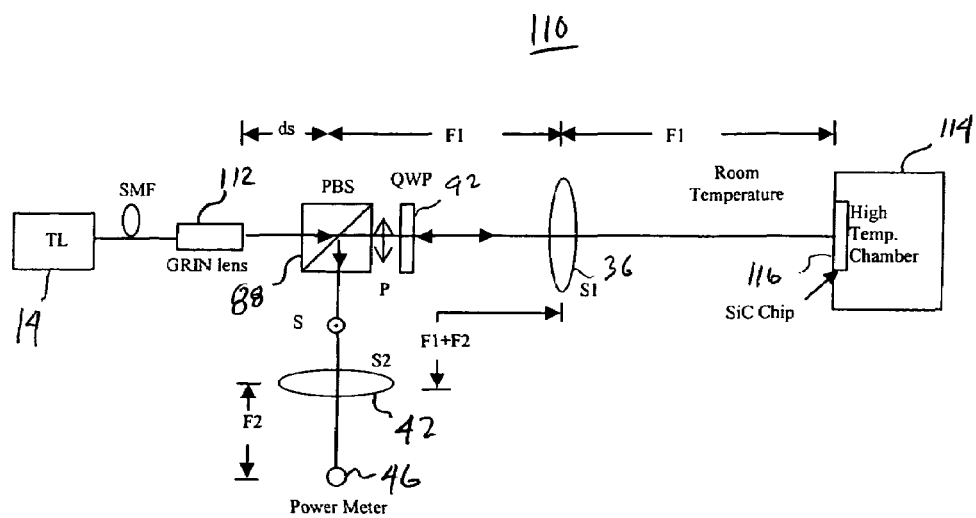
FIG. 8 is an alternate embodiment of a high temperature minimally invasive optical sensor using a single SiC chip and an appropriately imaged beam.

The FIG. 8 sensor system 110 is a single EOSC, such as an SiC chip 116, sensor design based on the FIG. 7 sensor design. A single SiC chip 116 with no coatings present is placed and sealed for example in a high temperature and pressure region 114. For example, an SiC used is 6H single crystal type with a refractive index of 2.57. Using Eqn.8, the SiC chip front surface power reflection coefficient is calculated to be R=0.193 implying that 19.3% of the input strike light on the chip take a first bounce off the chip to return to the photo-detector. On the other-hand, the light reflected first bounce back from the high temperature exposed rear surface of the SiC chip has a power reflection coefficient given by $R(1-R)^2=0.125$ or 12.5% of the input laser light. Light returning to the photo-detector after a second bounce from the SiC chip high temperature interface is a much smaller $R^3(1-R)^2 = 0.47$ or 0.47% fraction of the original input laser light power. These first order calculations firstly imply that about 0.193+0.125=0.318 or 32% of the input light power will return from the SiC chip to strike the receive photo-detector. Second, the natural reflection properties for the SiC chip in air produces strong two beam interferometry that is expected to give a classic sinusoidal interference function.

Given the sensor system's high efficiency (>30%), a typical lower power 1.5 mW tunable laser source can be used to launch light into the freespace optics coupled to the SiC chip. Specifically, a commercial tunable laser can have a wide 1500-1600 nm tuning range with a 0.01 nm tuning step and 0.0005 nm laser line-width. As seen in FIG. 8., the tunable IR laser is collimated by a fiber Graded Index Rod (GRIN) lens 112 with an example $d_s$=6 cm half self-imaging distance and an example 0.5 mm $1/e^2$ beam waist diameter or approximately 1 mm null-to-null beam size. The half-self imaging distance for the GRIN lens 112 is to location where the Gaussian beam has a minimum beam waist and hence perfect collimation [Martin van Buren and N. A. Riza, "Foundations for low loss fiber gradient-index lens pair coupling with the self-imaging mechanism," Applied Optics, LP, Vo.42, No.3, Jan. 20, 2003]. A mechanical fiber-based polarization controller (PC) may be used to produce the desired horizontal (or p) polarization light that exits the GRIN lens 112. This collimated light from the GRIN-lens 112 passes through a Polarization beam Splitter (PBS) 88 and only lets p- polarization light to pass through towards the SiC chip 116. Hence, the PBS 88 works as a polarization noise filter to prevent any unwanted s or vertical polarization input light from reaching the SiC chip 116. A lens S136 is placed between the GRIN lens 112 and SiC chip 116 to prevent large beam expansion. The distance between the fiber lens 112 and imaging lens S1 36 is for example 46 cm, where for example F1=40 cm is the focal length of S1 and 6 cm is from the GRIN half self-imaging distance. The distance as example between S1 36 and SiC chip 116 is 40 cm. The PBS 88 is as example placed 40 cm before S1 36. A QWP plate 92 oriented at 45° to the horizontal or p-axis is placed between the PBS and S. The QWP 92 converts the input linear p-polarization to circular polarization. As the SiC chip is a birefringent material, using circularly polarized input light makes the sensing system polarization independent to the SiC chip rotational orientation. As example, an F2=10 cm focal length sphere S2 42 is placed 10 cm from the PBS 88 deflected port, and a large area photo-detector 46 with as example 3.5 mm diameter is placed as example 10 cm away from lens S2 42. All optics are anti-reflection (AR) coated for the near IR 1550 nm band.

With the given optical design in FIG. 8, the Gaussian beam waist is formed on the SiC chip 116 and the photo-detector 46. The light beam waist on the SiC chip 116 is as example 1 mm null-to-null beam size while on the detector 46 it undergoes a factor of 4 reduction in size to 0.25 mm due to ratio of focal lengths F1/F2=40 cm/10 cm. This demagnification of the beam size makes the sensor received beam easily located within the 3.5 mm diameter active area of the as example Newport free-space coupled detector 46. Unlike FIG. 7, no active alignment mirrors are used because of the large area of the photo-detector size and as example the static and controlled environment of the SiC chip 116 placed in as example the high temperature test chamber. The chip 116 acts like a sealed optical window in the high temperature chamber 114. The chamber 114 assembly has coarse translation stages to adjust the position of the laser beam with-respect to the SiC chip designated targeting zone. An external fixed mirror M1 (not shown between the chip and lens S1) with fine x-y tilt control is used to make sure that the laser beam strikes the SiC chip 116 at normal incidence. The 6-H SiC single crystal chip 116 as example can be 320 micron thickness and a 0.25 cm ×0.25 cm rectangular size. The freespace laser beam only interacts with a small as example 1 mm diameter central targeted region on the SiC chip 116. Hence, high quality (e.g., $\lambda/50$) optical flatness requirements are only subjected to a very small region of the chip front and back surfaces. Note that for proper in-line interferometry, the front and back surfaces of the SiC chip 116 over the active laser region need to be parallel to enable high spatial coherence optical detection. In case, the surfaces are slightly non-parallel, a fringe pattern will appear on the detector surface. One can practically alleviate this issue by using a pin-hole placed in front of the photo-detector 46 with the pinhole size much smaller that a single fringe cycle. In this way, high spatial coherence interferometric data can be taken as needed for proper sensor operations. Single crystal SiC is known as an excellent optical quality material and hence it is optically suited for the minimally invasive sensor design. In the shown FIG. 8 case, the used SiC chip surfaces are the desired quality and no pinhole use is required as the large area Newport point photo-detector acts as a natural pin-hole. The sensor can zoom into a specific temperature zone and take extensive power data using accurate optical power meters and fast sampling data analog-to-digital converters. Hence, accurate calibration of the sensor is implemented using the robust signal processing methods.

In conclusion, the minimally invasive single crystal SiC chip-based optical sensor when used with the signal processing can provide true unambiguous temperature measurements for extremely high temperatures that the single crystal SiC can naturally withstand in environmentally unfriendly settings. A point to note is that the sensor performance can be considered coded in temperature period, i.e., a given temperature value is always within a specific sensor temperature period for a $2\pi$ it optical power cycle. This particular effect can also be used to extend the unambiguous temperature detection range of the sensor.

Finally, do note that the sensor can also be operated in an alternate signal processing wideband wavelength swept mode that simulates a broadband input source in time. Because state-of-the-art commercial tunable lasers in the 1550 nm band can sweep wavelength at a fast millisecond regime, a wide (e.g., 100 nm) spectral source can be quickly synthesized for the sensor. In this case, the sensor can generate the Fabry-Perot wavelength response of the SiC etalon at the instantaneous temperature without requiring a spectral resolution limited optical spectrum analyzer instrument. Nevertheless, the peak or notch movement of the synthesized received optical spectrum will have to be monitored to access temperature change, thereby running into the temperature sensing resolution constraints limited with monitoring individual notch or peak positions when the etalon spectral shape can deteriorate with changing high hazard extreme sensing conditions. In effect, if the deep notch (or peak) shape changes to a spectrally broad notch (or peak), the sensor temperature resolution will degrade. Furthermore, this data processing is based on a non-robust approach where over the entire temperature range of the sensor, one looks for one given optical power minimum (or maximum) value (here we are assuming equal notch depths) and determines temperature value by measuring the wavelength shift for this minima (or maxima). In the sensor signal processing, full cycle optical power readings and not just a minima (or maxima) power reading gives the sensor measured temperature. Hence, the sensor can use a more robust approach to processing that takes into account many optical power readings and not just a localized minima (or maxima) power reading. Of course, both signal processing methods can be engaged in the sensor without any hardware changes, thus adding built-in redundancy and fault-tolerance to the temperature measurements via the minimally invasive sensor.

In summary, the theory and signal processing of a novel extreme temperature optical sensor using tunable light, free-space beam targeted single crystal SiC chip frontends, strong two-beam single wavelength interferometry, and robust multi-wavelength signal processing concepts to simultaneously provide both high resolution and wide unambiguous range sensing for dynamic scenarios. Unlike previous wavelength sensitive sensors (e.g., FBG & etalon), the sensor design is not dependent on optical spectrum analyzer hardware resolution. Because temperature assessment is based upon monitoring optical power data over full min/max cycles and not just locating and tracking minima or maxima (as in traditional FBG and etalon-based sensors), a better sensor resolution can be achieved particularly when the etalon optical spectral filter function peaks/nulls shape change as etalon interface optical reflectivities change based on conditions in the dynamic sensing zone. The sensor relies on instantaneous single wavelength interferometry, thus eliminating inter-wavelength crosstalk issues. The sensor has an operating potential temperature near 2500° C., the melting point for single crystal SiC. Because single crystal SiC is a highly robust material from a mechanical and chemical point of view, the sensor can also be adapted for extreme environment pressure and chemical species sensing. Because of the material properties of single crystal SiC, pressure changes will cause both the material index and thickness to change in small amounts compared to temperature effects. In short, pressure will cause the measured power cycle phase to shift a fraction of the cycle, unlike temperature where there are many cycles of detected optical power change with temperature. Using multi-wavelength processing, pressure and temperature values can be calculated independently yet simultaneously.

The sensor can also produce traditional broadband spectral power sensing data using laser tuning. The tunable laser can also be temporally modulated to reduce system noise by generating the desired optical power data on an intermediate frequency (IF) for low 1/frequency noise signal processing including heterodyne processing. The sensor can also be used to characterize materials under extreme conditions. Strictly speaking, the optical power max/min data provided by the sensor occur for the SiC chip condition $\cos \phi = \pm 1$. From these data points collected over a given sensing parameter (e.g., temperature) range, sensor $OPL = \phi$ can be calculated that contains SiC material refractive index, thickness, and wavelength data. Note that all $P_m$ data points can also be used to compute SiC material parameters such as the change of index with temperature called thermo-optic coefficient.

While various embodiments of the present invention have been shown and described herein, it will be obvious that such embodiments are provided by way of example only. Numerous variations, changes and substitutions may be made without departing from the invention herein.

The invention claimed is:

1. A remote sensing system comprising:
a sensor device having known characteristics that vary responsive to changes in a monitored condition;
a first light source for directing a first light beam having a first wavelength at the sensor device;
a second light source for directing a second light beam having a second wavelength different from the first wavelength at the sensor device;
a photo detector for receiving the first light beam and the second light beam from the sensor device and for providing respective sensing signals corresponding to the first light beam and the second light beam received from the sensor device; and
a processor for receiving the respective sensing signals and for determining a condition proximate the sensor device by comparing characteristics of the sensing signals to the known characteristics.

2. The system of claim 1, wherein the first and second light sources comprise a single light source capable of producing the first light beam and the second light beam.

3. A remote sensing method comprising:
directing a first light beam having a first wavelength at a sensor device having characteristics that sinusoidally vary responsive to changes in a monitored condition;
directing a second light beam having a second wavelength different from the first wavelength at the sensor device;
receiving the first light beam and the second light beam from the sensor device; and
determining a condition proximate the sensor device by comparing characteristics of the the first light beam and the second light beam received from the sensor device to the known characteristics.

4. The method of claim 3, wherein determining a condition proximate the sensor device comprises resolving a sinusoidally varying ambiguity responsive to a relative phase shift between the first light beam and the second light beam received from the sensor device.

5. The method of claim 4, further comprising selecting a value of the first wavelength and a value of the second wavelength to allow resolving the periodic ambiguity.

6. The method of claim 3, wherein determining a condition proximate the sensor device comprises normalizing an optical power of the first light beam received from the sensor device and an optical power of the second light beam received from the sensor device before comparing characteristics.

7. A method for remotely sensing environmental conditions comprising:
disposing an etalon having known characteristics in an environment in which conditions are to be sensed;
directing a light beam at a first frequency and a light beam at a second frequency at the etalon;
determining a first phase of the light beam at the first wavelength received from the etalon and a second phase of the light beam at the second wavelength received from the etalon;
determining a phase difference between the first phase and the second phase; and
determining an environmental condition proximate the etalon by comparing at least one of the first and second phases and the phase difference to the known characteristics.

8. The method of claim 7, wherein the first frequency and the second frequency are selected so that a phase difference between respective optical power responses of the etalon for the first frequency and for the second frequency over a predetermined range of conditions is less than about pi radians.

9. The method of claim 7, wherein the light beams are directed to impinge upon a face of the etalon at an angle normal to the face.

10. The method of claim 7, wherein the known characteristics comprise phase information corresponding to a range of environmental conditions.

11. The method of claim 10, wherein the environmental conditions comprise at least one of temperatures and pressures.

12. The method of claim 7, wherein determining the first phase and the second phase comprises:
sensing respective optical powers of the light beam at the first wavelength and the light beam at the second wavelength via at least one of reflection from the etalon and transmission through the etalon; and
extracting phase information from the respective optical powers.

13. The method of claim 12, wherein a photo detector is to used sense the respective optical power.

14. The method of claim 12, further comprising:
providing a first photo detector for sensing the optical power at the first wavelength;
providing a second photo detector for sensing the optical power at the second wavelength; and
directing the light beam at the first wavelength received from the etalon to the first detector and directing the light beam at the second wavelength received from the etalon to the second detector using a wavelength spatial separator.

15. The method of claim 12, wherein the optical power at the first wavelength is established by:
dithering the first wavelength while directing the light beam at the etalon until sensing a maximum power in a corresponding received optical power;
dithering the first wavelength while directing the light beam at the etalon until sensing a minimum power in the corresponding received optical power; and
normalizing the optical power responsive to the maximum power and the minimum power.

16. The method of claim 12, wherein the optical power at the second wavelength is established by:
dithering the second wavelength while directing the light beam at the etalon until sensing a maximum power in a corresponding received optical power;
dithering the second wavelength while directing the light beam at the etalon until sensing a minimum power in the corresponding received optical power; and
normalizing the optical power responsive to the maximum power and the minimum power.

17. The method of claim 7, wherein the etalon comprises at least two parallel polished faces.

18. The method of claim 17, wherein the etalon has less than about 20% optical reflectivity at the respective faces.

19. The method of claim 7, wherein the etalon comprises silicon carbide.

20. The method of claim 7, wherein the etalon is used in a mode that generates an optical power responsive to the light beam proportional to a cosine of at least one of an optical phase and an optical path length in the etalon.

21. The method of claim 7, wherein the light beams directed at the etalon are produced by a single laser capable of selectively generating light at the first wavelength and the second wavelength.

22. The method of claim 21, wherein the laser is amplitude modulated.

23. The method of claim 7, wherein the light beam directed at the etalon is produced by a first laser generating light at the first wavelength and a second laser generating light at the second wavelength.

24. The method of claim 23, wherein the first and second lasers are amplitude modulated.

25. The method of claim 7, wherein light beams directed at the etalon are generated using a broadband light source.

26. The method of claim 25, wherein the light beams received from the etalon are sensed using an optical spectrum analyzer.

27. The method of claim 7, wherein the light beam is directed at the etalon along a path comprising at least a portion of free space.

28. The method of claim 27, wherein the path includes a single mode optical fiber and a fiber collimation lens.

29. The method of claim 7, wherein the light beam is received from the etalon along a path comprising at least a portion of free space.

30. The method of claim 29, wherein the path includes a single mode optical fiber and a fiber collimation lens.

31. The method of claim 7, further comprising:
disposing a plurality of precalibrated weak etalon etalons at different locations; and
performing the steps of claim 7 for each of the etalons to determine a condition at each of the different locations.

32. The method of claim 31, further comprising using a adaptive mirror device for directing the light beams at the etalons and for receiving light beams from the etalons.

33. The method of claim 7, further comprising using an adaptive mirror device for ensuring that the light beams received from the etalon are focused on alight beam sensor.

34. The method of claim 7, further comprising mixing at least one of the light beams received from the etalon with a portion of a corresponding light beam not directed at the etalon before determining the first phase and second phase.

35. The method of claim 34, further comprising Doppler shifting the portion of the corresponding light beam.

36. The method of claim 34, further comprising:
polarizing the light beams directed at the etalon; and
polarization splitting the light beams received from the etalon and separately detecting optical powers of the light beams received from the etalon according to their respective polarizations.

37. The method of claim 7, further comprising using an optical circulator to direct the light beams to the etalon and for receiving the light beams from the etalon.

* * * * *